(12) United States Patent
Aoshima et al.

(10) Patent No.: US 6,469,472 B1
(45) Date of Patent: Oct. 22, 2002

(54) ELECTRONIC DEVICE AND CONTROL METHOD FOR THE SAME

(75) Inventors: Ichiro Aoshima, Shimosuwa-machi; Motomu Hayakawa, Shiojiri; Tsukasa Kosuda, Matsumoto; Katsuyuki Honda, Shiojiri, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/700,902

(22) PCT Filed: Mar. 21, 2000

(86) PCT No.: PCT/JP00/01705

§ 371 (c)(1),
(2), (4) Date: Nov. 17, 2000

(87) PCT Pub. No.: WO00/55955

PCT Pub. Date: Sep. 21, 2000

(30) Foreign Application Priority Data

Mar. 18, 1999 (JP) .......................... 11-074424
Sep. 30, 1999 (JP) .......................... 11-279966

(51) Int. Cl.⁷ .............................. H02J 7/00
(52) U.S. Cl. .................................. 320/122
(58) Field of Search ................. 320/122; 340/870.31

(56) References Cited

U.S. PATENT DOCUMENTS 5,105,190 A  4/1992 Kip et al. ............... 340/10.34
5,345,231 A * 9/1994 Koo et al. ............. 340/870.31

FOREIGN PATENT DOCUMENTS

| DE | 767946 | * | 4/1997 |
| JP | 7-79182 | | 3/1995 |
| JP | 7-273697 | | 10/1995 |
| JP | 11-120306 | | 4/1999 |

* cited by examiner

Primary Examiner—Edward H. Tso
Assistant Examiner—Pia Tibbits

(57) ABSTRACT

In an electronic device in which a charge path to a secondary battery and a signal path to a reception device are partially shared and a receiving-time current due to the reception is made to be a charging current for the secondary battery, even in a case in which the voltage across the secondary battery is close to a maximum voltage, by bypassing the charging current due to the signal reception, the voltage across the secondary battery is controlled so as not to exceed the maximum voltage.

24 Claims, 15 Drawing Sheets

$V = V_o + ir$ i : CHARGING CURRENT
r : INTERNAL RESISTOR IN CHARGING
V : BATTERY VOLTAGE IN CHARGING
$V_o$ : ACTUAL BATTERY VOLTAGE

ELECTRONIC DEVICE AND CONTROL METHOD FOR THE SAME

DESCRIPTION

1. Technical Field

The present invention relates to electronic devices and to control methods for the electronic devices, and more particularly, relates to an electronic device and to a control method for the electronic device in which, a secondary battery can be charged during reception of communication signals by using part of a signal-reception path as a charging path for supplying charging current to the secondary battery.

2. Background Art

Recently, devices which have a construction in which a small portable electronic device such as a portable terminal or an electronic watch, is placed into a charger called a "station" whereby the electronic device is charged, are known.

In such a construction, a lithium-ion secondary battery, provided as a storage device for storing charged electrical energy, is provided in the small portable electronic device.

This lithium-ion secondary battery has features such as high voltage, high energy density, and relatively lower self-discharge. It is often used in small portable electronic devices (such as portable telephones, camera-integrated type videotape recorders, and notebook type personal computers) which require particularly high energy density.

When more than a so-called "tolerance voltage" (i.e limit voltage or maximum voltage) is applied to the above-described lithium-ion secondary battery, dendritic deposits form and then internal short-circuiting phenomena occur, which ultimately shortens the life of the battery.

Hence, in a conventional charging method, constant charging current is applied to the lithium-ion secondary battery until the charged voltage across the lithium-ion secondary battery reaches the tolerance, i.e. maximum, voltage. After the charged voltage reaches the tolerance voltage, charging is performed at a constant voltage (see Japanese Unexamined Patent Publication No. 5-111184 for details).

Moreover, when charging is performed between a small portable electronic device and the charger, a limiter circuit for limiting the increase in voltage across the battery is provided so that the battery voltage across the lithium-ion secondary battery does not exceed the tolerance voltage.

Not only charging, but also communication, is performed between the small portable electronic device and the charger by using of a charging path and a signal-receiving path. In addition, in a case in which charging and data communication are performed using the same system (for example, an electromagnetic coupling system or an optical coupling system) the battery voltage across the lithium-ion secondary battery must be controlled so as not to exceed the tolerance voltage by causing the above-described limiter circuit to operate so that the battery voltage across the lithium-ion secondary battery does not exceed the tolerance voltage while charging is performed.

However, when a small portable electronic device receives a signal and the limiter circuit is activated, the limiter circuit prevents voltage variations from being conducted to a reception circuit. Accordingly, the reception circuit fails to receive the signal.

Therefore, the limiter circuit is constructed so as to be inactive while communication is performed.

Accordingly, when a small portable electronic device receives data, there is an advantage in that the small portable electronic device can be charged using surplus electric power not required for communication. However, when the battery voltage across the lithium-ion secondary battery of the small portable electronic device is close to the tolerance voltage, there is a problem in that the battery voltage across the lithium-ion secondary battery may exceed the tolerance voltage since the limiter circuit is deactivated during data reception, which shortens the life of the lithium-ion secondary battery.

Accordingly, objects of the present invention are to provide an electronic device and a control method for the electronic device in which the voltage across the secondary battery can be prevented from exceeding its tolerance voltage (i.e. its maximum rated voltage) and the secondary battery can be prevented from being degraded when receiving-time charging current during periods of data communication.

SUMMARY OF INVENTION

An electronic device according to the present invention is characterized in that there is provided a storage device on which charging can be performed from the outside, and the charged voltage of the storage device is controlled so as not to exceed a predetermined tolerance, or maximum, voltage. The electronic device further includes a reception device for receiving a signal from the outside, and a charging-current-control means for controlling a charging currentapplied to the storage device resulting from the signal reception, so that the voltage across the storage device does not to exceed the tolerance voltage. By using part of a signal path to the reception device as a charging path to the storage device, the storage device may be charged at the time that the reception device receives signals.

An electronic device according to another aspect of the present invention includes a storage device in which charging can be performed from the outside, and the charged voltage of the storage device is controlled so as not to exceed a predetermined tolerance voltage. The electronic device further includes a reception circuit to receive a signal from the outside, whereby the application of a charging current to the storage device is enabled at the time of signal reception by using part of the signal-reception path to the reception circuit as a charging current path to the storage device. The electronic device is characterized in that there is provided an energy balance control means for controlling the accumulated voltage across the storage device so as not to exceed its tolerance voltage by controlling a balance between charge energy to the storage device and discharge energy from the storage device.

An electronic device according to still another aspect of the present invention includes a storage device in which charging can be performed from the outside of the electronic device, and the charge voltage is controlled so as not to exceed a predetermined maximum voltage. and the electronic device further includes a reception circuit to receive a signal from the outside, wherein reception of a signal by the reception device causes charging of the storage device by using part of a signal path to the reception device as a part of a charging path to the storage device. The electronic device is further characterized by a charging-current-control means and a switching means. The charging-current-control means is provided with an accumulated voltage detection means for measuring the accumulated voltage across the storage device. The switching means is provided between the reception device and the storage device and is effective for causing the reception device and the storage device to be disconnected when the accumulated voltage detected by the accumulated voltage detection means exceeds the maximum voltage.

A control method is provided for an electronic device according to the present invention, which includes a storage device that can be charged from the outside and whose charge voltage is controlled so as not to exceed a predetermined maximum voltage, and a reception circuit to receive a signal from the outside. By using part of a charging path to the storage device and as a signal path to the reception circuit, the storage device may be charged while the reception device is receiving signals. The control method for an electronic device is characterized in that there are provided a voltage measuring step for measuring the voltage across the storage device and a charging-current-bypass step for controlling the voltage across the storage device so as not to exceed the tolerance voltage, by bypassing away from the storage device, the charging currentresulting from the reception, by a predetermined amount based on the measured voltage across the storage device.

DETAILED DESCRIPTION OF THE PREFERRED EMBODIMENTS

In order to more fully describe the present invention, this is explained with reference to the attached drawings.

The first embodiment of the present invention will be described. Although in the present embodiment an example in which an electronic watch is used as an electronic device and a station is used for charging the electronic watch as well as for communicating with the electronic watch is described, the present invention is not intended to be limited thereto.

Figure 1:
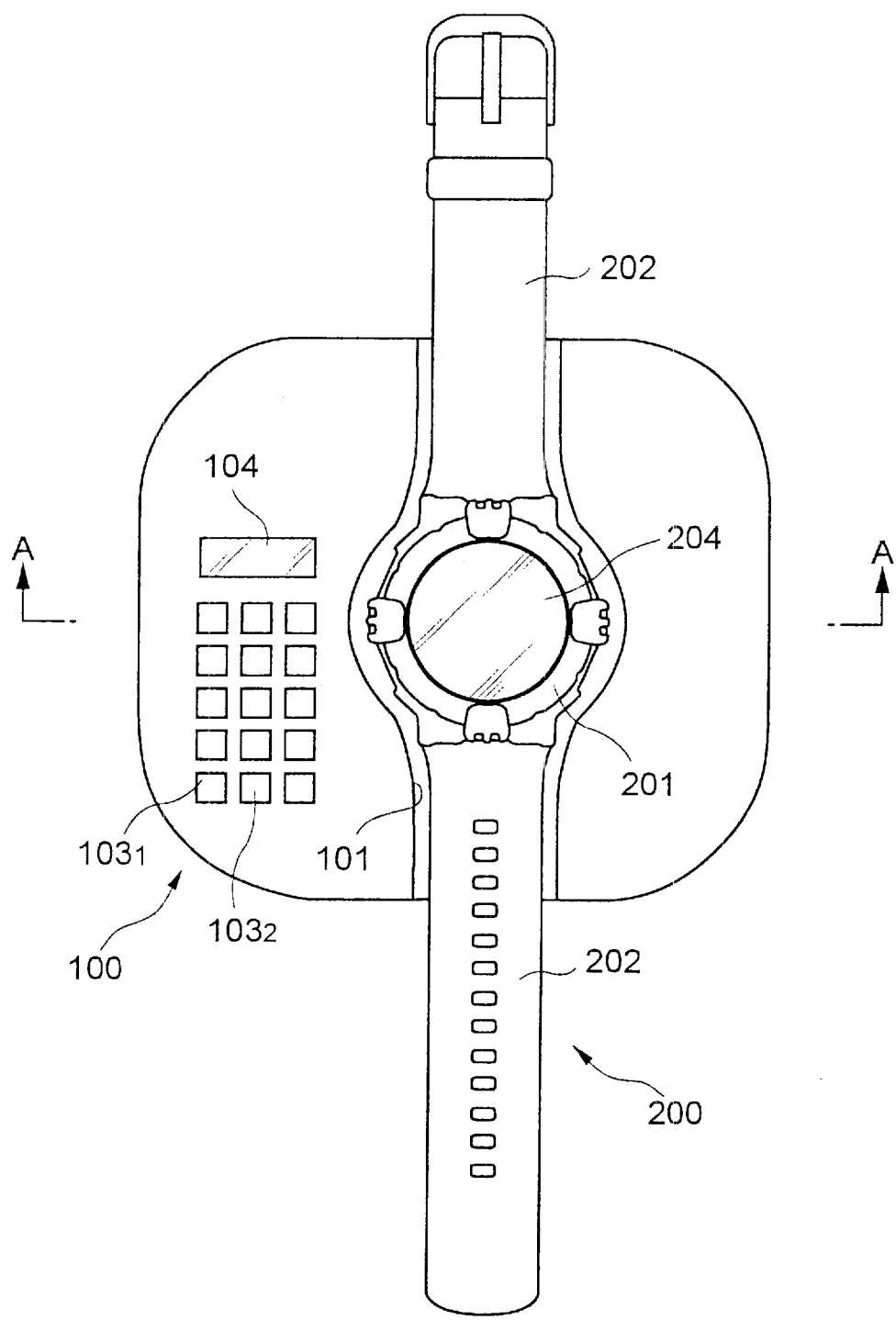
FIG. 1 is a plan view showing constructions of a station and an electronic watch according to an embodiment of the present invention.

FIG. 1 shows a plan view of the electronic watch and the station according to the present invention.

As shown in FIG. 1, an electronic watch 200 is contained in a concave part 101 of a station 100 when charging, data transfer, or the like is performed. Since this concave part 101 is formed to have a shape in which the concave part 101 is slightly larger than the main body 201 of the electronic watch 200 and the band 202, the main body 201 of the watch is cradled so as to be accommodated in the station 100.

The station 100 is provided with various input units such as a charging start button 1031 for instructing the start of charging, a transfer start button 1032 for instructing the start of data transfer, and a display unit 104 for displaying various displays. The electronic watch 200 according to the present embodiment is constructed so as to be worn on a wrist of a user in a normal operating condition so as not only to display the date, the time, and the like on a display unit 204, but also to sense and store, using a sensor or the like which is not shown, vital information, such as the pulse rate or the heart rate, every predetermined time period.

Figure 2:
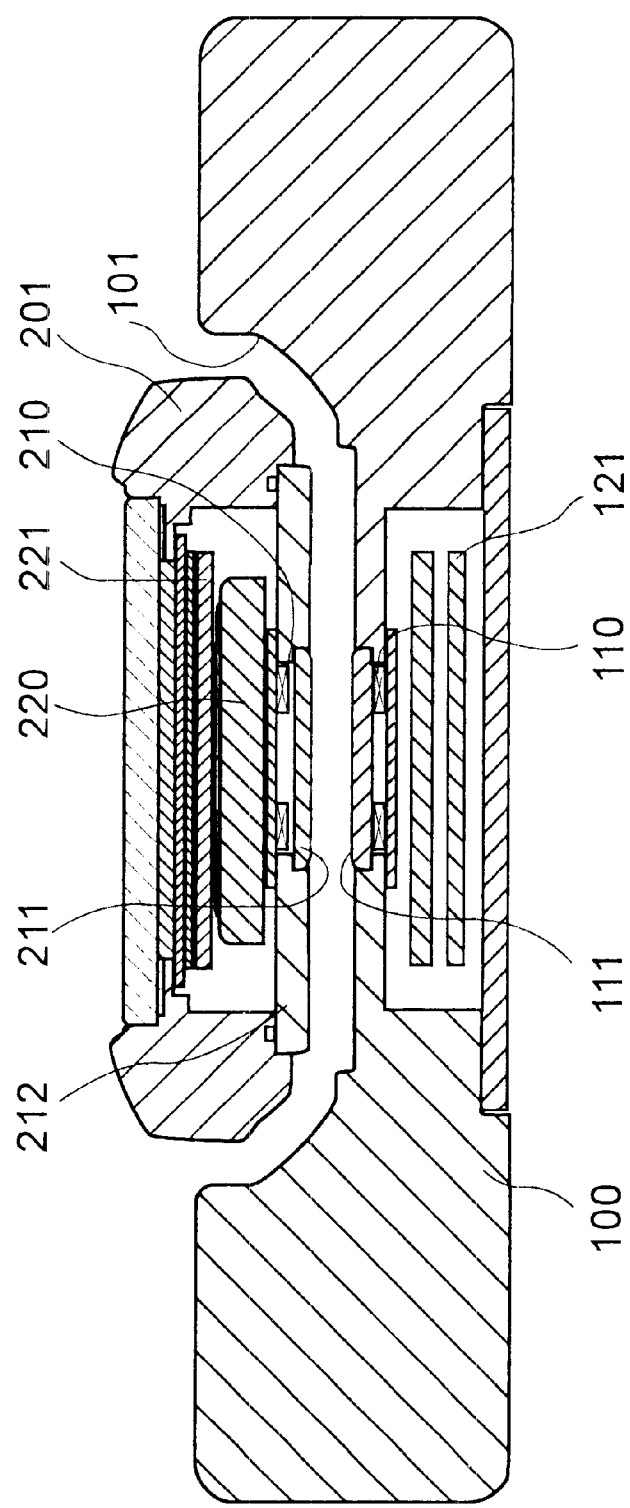
FIG. 2 is a cross-sectional view showing the constructions of the station and the electronic watch according to an embodiment of the present invention.

FIG. 2 is a cross sectional view taken along line A—A in FIG. 1. As shown in this figure, a watch-side inductor 210 for transferring data and for charging is provided via a cover glass 211 in a bottom back cover 212 of the main unit 201 of the electronic watch. The main body 201 of the watch is provided with a circuit substrate 221 connected to a secondary battery 220, the watch-side inductor 210, and the like.

On the other hand, in the concave part 101 of the station 100, a station-side inductor 110 is provided via a cover glass 111 at a position which faces the watch-side inductor 210. The station 100 is provided with the inductor 110, the charging start button 1031 (FIG. 1), the transfer start button 1032 (FIG. 1), the display unit 104 (FIG. 1), and a circuit substrate 121 connected to a primary source (not shown) and the like.

Thus, in a state in which the electronic watch 200 is cradled in the station 100, although the station-side inductor 110 and the watch-side inductor 210 are not physically in contact with each other because of the cover glasses 111 and 211, since the inductor winding faces thereof are substantially in parallel, the station-side inductor 110 and the watch-side inductor 210 are in an electromagnetically coupled state.

The station-side inductor 110 and the watch-side inductor 210 are air-core inductors having no magnetic core in order to avoid magnetization of mechanical parts of the watch to avoid increasing the weight of the watch-side, to avoid exposure of magnetic metals, and the like. Hence, the adoption of an inductor having a magnetic core may be applied to an electronic device in which these reasons do not matter. However, when the frequency of a signal applied to the inductor is sufficiently high, the air-core inductor suffices.

Next, a general construction of the electronic watch in accord with the present invention is described.

Figure 3:
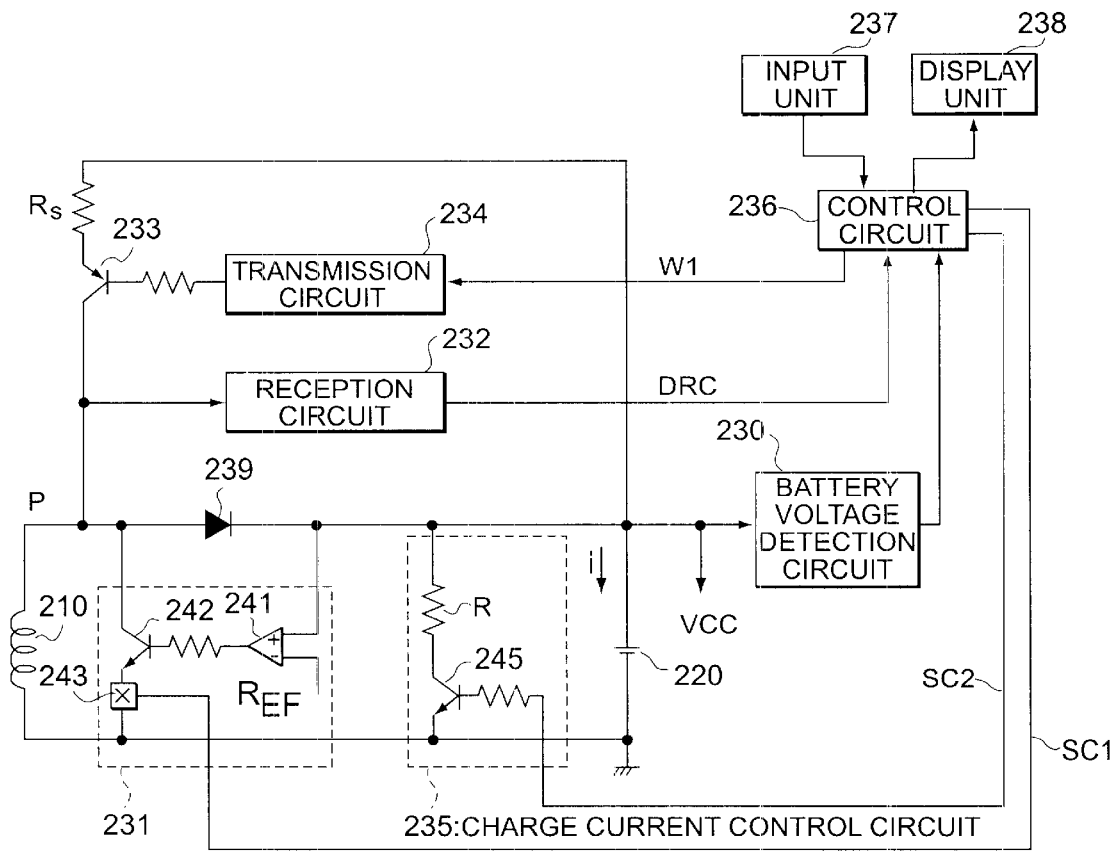
FIG. 3 is a general construction block diagram of main components of the electronic watch in FIG. 1.

FIG. 3 shows a general construction block diagram of the main components of the electronic watch 200.

The electronic watch 200 is roughly divided into the watch-side inductor 210 serving as a transmission/reception antenna for electromagnetic coupling data; a secondary battery 220 serving as a storage means; a battery voltage detection circuit 230 for detecting the battery voltage across the secondary battery 220; the limiter circuit 231 for electrically disconnecting the secondary battery 220 from the watch-side inductor 210 when the voltage across the secondary battery 220 exceeds a predetermined maximum, i.e. limit, voltage; a reception circuit 232 for receiving various signals via the watch-side inductor 210 and outputting the reception data DRC; a transmission circuit 234 for transmitting various signals via a drive transistor 233 and a transmission resistor Rs; a charging current control circuit 235 for controlling charging current of the secondary battery 220 when the reception circuit 232 receives signals; a control circuit 236 for controlling the entirety of the electronic watch 200; an input unit 237 for allowing a user to input various data; a display unit 238 for displaying various information under the control of control circuit 236; and a reverse-current protection diode 239 for preventing a reverse current from the watch-side inductor 210.

The limiter circuit 231 is constructed to be provided with a comparator 241 for setting a limit control signal to an "H", i.e. high logic, level when the voltage across the secondary battery 220 exceeds a reference voltage REF corresponding to the predetermined maximum voltage; a transistor switch 242 electrically disconnecting the secondary battery 220 from the watch-side inductor 210 by causing the output terminal of the watch-side inductor to be in a short-circuit state due to the switch being turned on when the limit control signal output from the comparator 241 is at "H" level; and an analog switch 243 under the control of the control circuit 236 for causing the limiter circuit 231 to be turned on and causing it to be in an inactive state.

The charging current control circuit 235 is provided with a transistor switch 245 turned on by control circuit 236 setting charging current control signal SC2 to an "H" level when reception circuit 232 receives signals; and a charging-current control resistance R controlling the charging current through secondary battery 220 by causing a current determined by charging-current control resistance R to flow as a bypass current when transistor switch 245 is on.

Here, the relationship between the charging voltage across the secondary battery 220 and the charging current will be described.

Figure 4:
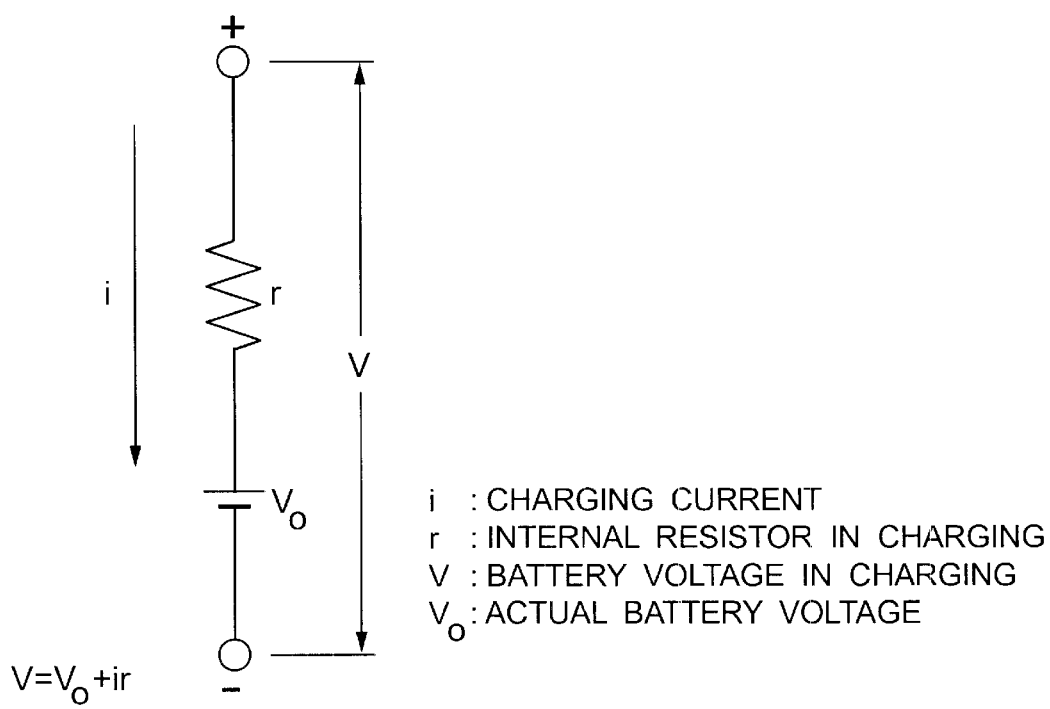
FIG. 4 is a diagram illustrating the charging voltage across a secondary battery.

FIG. 4 shows an equivalent circuit diagram of the secondary battery 220, which includes an internal resistance r in series with actual voltage $V_0$ across the secondary battery when it is not being charged.

As shown in FIG. 4, in the case where the actual, non-charging battery voltage across the secondary battery 220 is denoted as $V_0$ and the internal resistance of the secondary battery 220 is denoted as r, if a charging current i is applied to the secondary battery 220, then the charging voltage V, i.e. the voltage across the secondary battery 220 during a charging operation, is represented by the following expression:

$$V=V_0+i \cdot r.$$

Next, the operating principle of the charging current control circuit 235 will be described.

As described above, since the charging voltage V across the secondary battery 220 is represented by the expression $$V=V_0+i \cdot r,$$

when the maximum voltage (i.e. the tolerance, limit, or peak voltage) across the secondary battery 220 is denoted as V', the charging current i may be controlled so that the charging voltage V does not exceed the maximum voltage V', i.e. so that the relation V<V' is satisfied.

Two approaches for selecting an appropriate charging-current control resistance R in accord with the present first embodiment so that this relation is satisfied are described with reference to FIG. 5.

Figure 5:
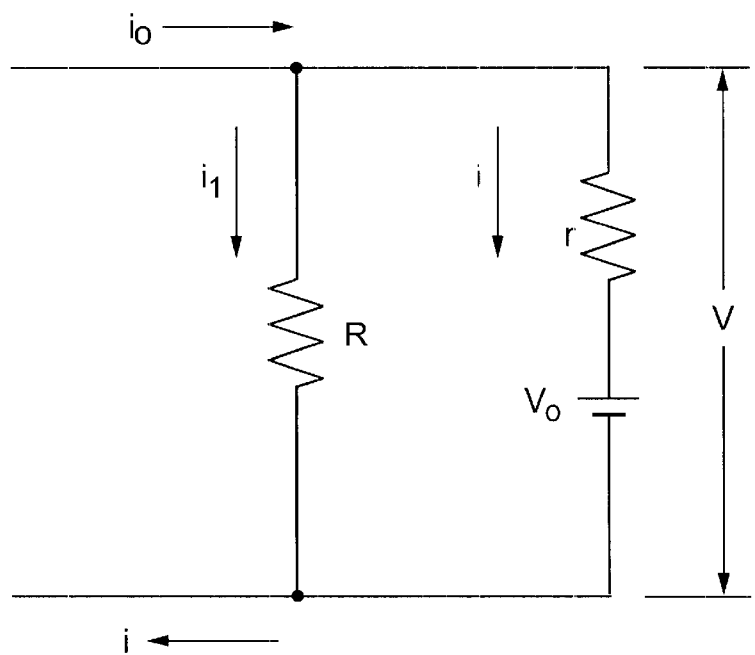
FIG. 5 is a diagram illustrating the operating principle of the present invention.

FIG. 5 shows a simplified circuit structure for controlling charging current in accord with the present invention.

When the current flowing through charging-current control resistance R is denoted as $i_1$, since $$V<V',$$

$i_1 \cdot R<V'$, that is, it is sufficient that $$i_1<V'/R \tag{1}$$

is satisfied.

Furthermore, when $$i<0,$$

the secondary battery 220 is not being charged. Since the input current $i_0$ is defined as $$i_0=i_1+i,$$

$$i_0<i_1 \tag{2}$$

Therefore, based on the expressions (1) and (2), it is sufficient that $$i_0<V'/R \tag{3}$$

is satisfied. This expression (3) may be rewritten as:

$$R<V'/i_0$$

Thus, a first approach in accord with the first embodiment for selecting an appropriate value of R requires that R be chosen such that the above rewritten expression is satisfied, the secondary battery 220 is not charged beyond the maximum voltage V'.

As an example, in a sample case where the maximum voltage V'=4 [V] and the input current $i_0$=10 [mA], since $$R<4/10\times10^{-3}=400 \ [\Omega],$$

it is sufficient that the resistance of the charging-current control resistance R be set to 400 [Ω].

The above-described approach is a simple method for selecting a value for charging-current control resistance R. The following second approach in accord with the first embodiment of the present invention provides more accurately method of selecting a resistance value charging-current control resistance R.

As shown in FIG. 5, $$i_0=i_1 \tag{1}$$

and $$V=i_1 \cdot R \tag{2}$$

$$=i \cdot r+V_0 \tag{3}$$

are obtained. Here, when the expression (2) is changed, $$i_1 = V/R \quad (4)$$

is obtained. When the expression (3) is changed, $$i_1 = \{1/(R+r)\} \cdot (i_0 \cdot r + V_0) \quad (5)$$

is obtained.

Based on the expressions (1) and (4)

$$i_1 = i_0 - V/R \quad (6)$$

$$= i_0 - \{(i_0 \cdot r + V_0)/(R+r)\} \quad (7)$$

is obtained.

Furthermore, based on the expressions (4) and (5), $$V \; 32 \; R/(R+r) \; (i_0 r + V_0) \quad (8)$$

is obtained. Since it is sufficient that $$V < V' \quad (9)$$

be satisfied, based on the expressions (8) and (9), the second approach for selecting a value of R takes the following expression (10)

$$R \leq (r \cdot V')/(i_0 \cdot r + V_0 - V') \quad (10)$$

Therefore, by determining the charging-current control resistance R based on the input current $i_0$, the internal resistance r of the secondary battery, the actual battery voltage $V_0$, and the maximum voltage V', the voltage across the secondary battery 220 may be controlled so as to not exceed the maximum voltage V'.

Next, operation of the electronic watch 200 of FIGS. 1–3 according to the first embodiment are described particularly when signals are received.

The watch-side inductor 210 of the electronic watch 200 functions as a transmitting and receiving antenna for communicating data through electromagnetic coupling. When a signal is transmitted from the station-side inductor 110 of the station 100, notification of the transmission is sent to the control circuit 236.

Because of this, the control circuit 236 outputs a control signal SC1 and causes the analog switch 243 of the limiter circuit 231 to be turned off.

Hence, regardless of whether the transistor switch 242 is turned on or off, the limiter circuit 231 does not effectively operate.

After that, the reception circuit 232 receives various signals via the watch-side inductor 210 and outputs the received data to the control circuit 236.

While this reception circuit 232 receives various signals, the battery voltage detection circuit 230 detects the battery voltage across the secondary battery 220 and reports the detection result to the control circuit 236.

On the other hand, when the charging voltage V, which is detected by the battery voltage detection circuit 230, and which is the battery voltage across the secondary battery 220 during charging, exceeds a predetermined activation threshold voltage VTH, the control circuit 236 causes the switch transistor 245 to be turned on by outputting a control signal SC2.

As a result, in the case in which the charging current i is controlled using the above-described first approach of the first embodiment for setting the charge-current control resistance R, since the charge-current control resistance R is determined based on maximum voltage V' desirable for secondary battery 220 so that the relationship $$R \leq V'/i_0$$

is satisfied, when the reception circuit 232 receives the signals, the current i flowing through the secondary battery 220 is $$i < 0.$$

Hence, the secondary battery 220 is not charged.

In the second approach of the first embodiment, the charging current i is controlled by determining a value for the charge-current control resistance R based on the desired maximum voltage V', the internal resistance r of secondary battery 220, and the actual battery voltage $V_0$ so as to satisfy the following relationship $$R \leq (r \cdot V')/(i_0 \cdot r + V_0 - V')$$

Hence, the charging voltage V across the secondary battery 220 always satisfies the relationship $$V < V'$$

and the charging voltage V across the secondary battery 220 does not exceed the maximum voltage V'.

As described above, according to the first embodiment, when signals are received, since the voltage across the secondary battery does not exceed the maximum voltage V', degradation of the secondary battery due to reception of the signals can be prevented.

In the above-described first embodiment, the circuit configuration for controlling of the charging current to prevent the voltage across the secondary battery from exceeding a predetermined maximum voltage V', does not change regardless of the mode, i.e. the data content, of the received signals. However, in following second embodiment, the charging current is controlled in accordance with the mode, i.e. data content, of the received signals.

Figure 6:
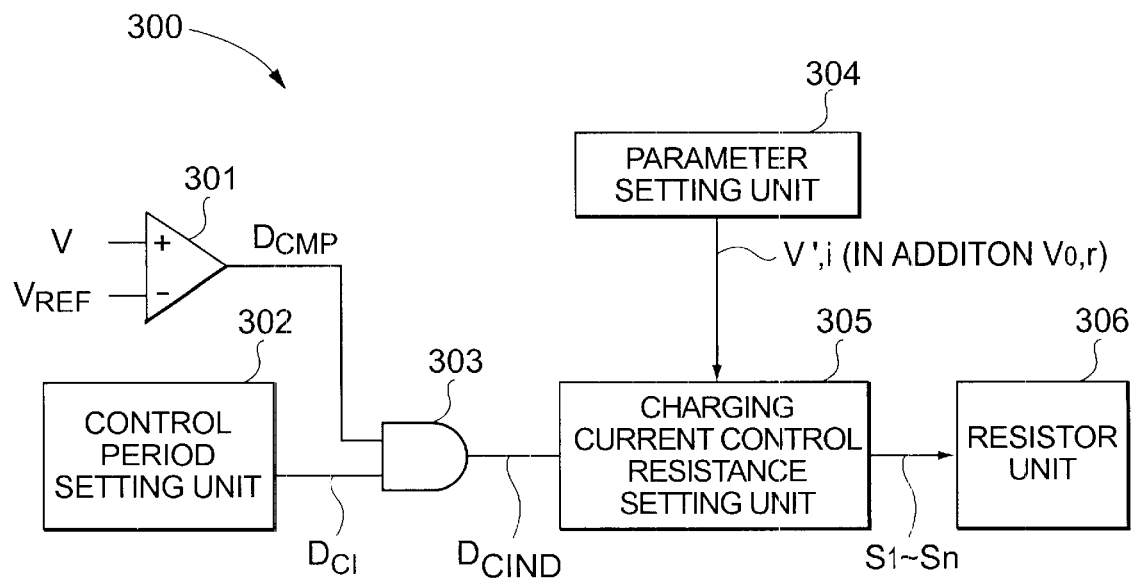
FIG. 6 is a general construction block diagram of a charge current control circuit according to a second embodiment.

FIG. 6 shows the construction of the charging current control circuit according to this second embodiment.

A charging current control circuit 300 is provided with a comparator 301 for comparing the charging voltage V with a predetermined reference voltage $V_{REF}$ and outputting the comparison result data $D_{CMP}$; a control period setting unit 302 for generating and outputting control period setting data $D_{CI}$ for setting a period during which to perform charge-current control; an AND circuit 303 for applying the logical product of the comparison result data $D_{CMP}$ and the control period setting data $D_{CI}$, and outputting the product as control period instruction data $D_{CIND}$; a parameter setting unit 304 for setting at least the maximum voltage V' and the charging current i from among a list of parameters including the maximum voltage V', the charging current i, the actual battery voltage $V_0$, and the internal resistance r of the secondary battery; a charging current control resistance setting unit 305 for outputting corresponding control signals S1 to Sn in order to select (based on the parameters V', i, $V_0$, r, and the control period instruction data $D_{CIND}$) one or a plurality of charge-current control resistances to be actually used from among the described-below charge-current control resistance R1 to Rn; and a resistance unit 306 for changing the resistance of the actual charge-current control resistance based on corresponding control signals S1 to Sn.

Figure 7:
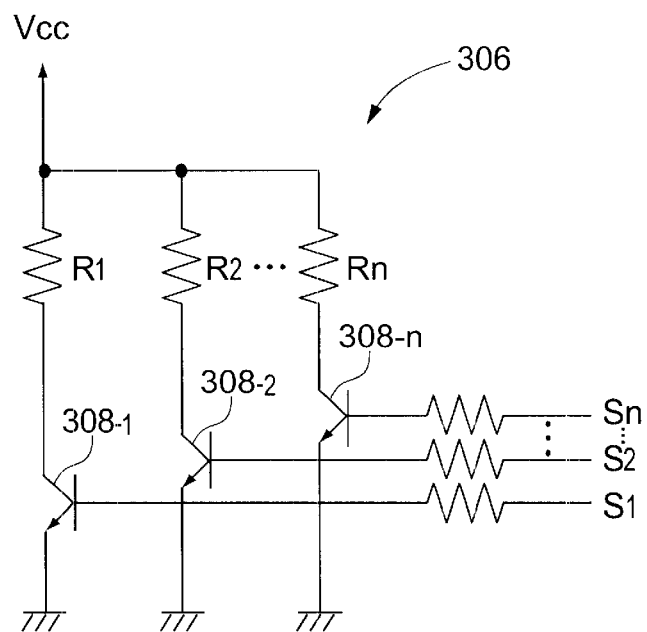
FIG. 7 is a diagram illustrating one example of a resistance unit.

FIG. 7 shows one example construction of the resistance unit 306.

The resistance unit 306 is provided with transistor switches 308-1 to 308-n, which are respectively turned on in response to the application of a "H" level signal at their respective control signal S1-Sn by the charging current control resistance setting unit 305 during the signal reception operations; and charge-current control resistances R1-Rn controlling the charging current flowing through the secondary battery 220 by causing the current to be diverted to any of resistances R1-Rn when the resistances' corresponding transistor switch 308-1 to 308-n is turned on.

Here, a reason why the second embodiment uses the variable resistance unit 306 instead of the fixed charge-current control resistance R of the first embodiment is described.

Figure 8:
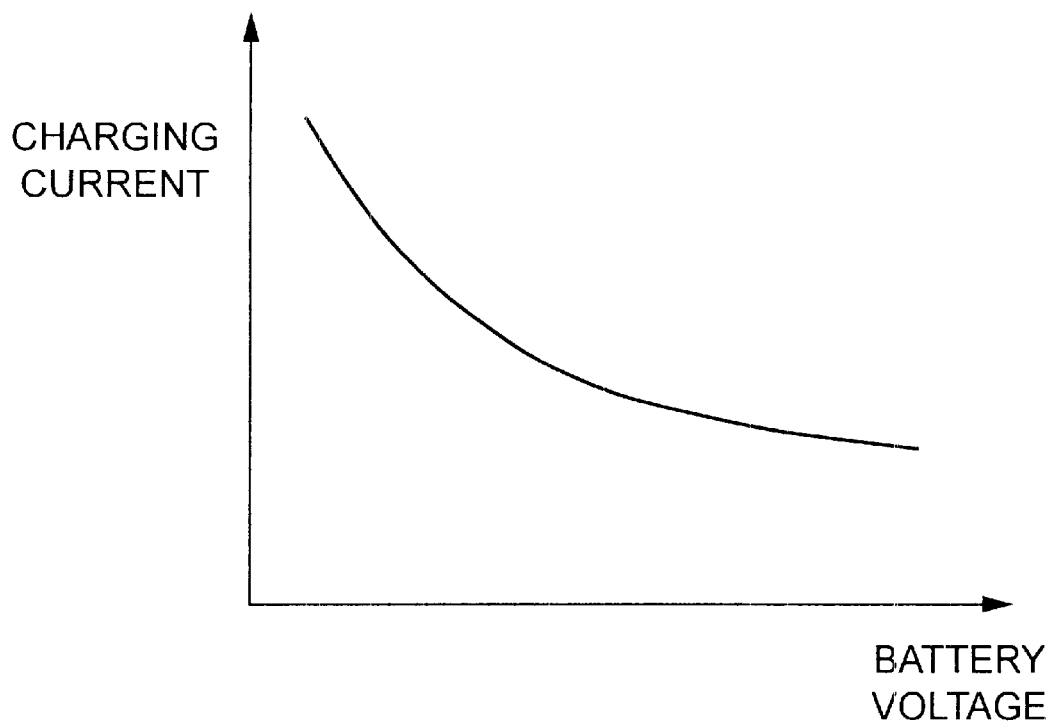
FIG. 8 is a graph illustrating the relationship between a charging current and a battery voltage.

As shown in FIG. 8, the charging current of the secondary battery 220 is varied in accordance with the battery voltage. The higher the battery voltage becomes, the lower the charging current i becomes.

Accordingly, as shown in the first embodiment, when the resistance of the charge-current control resistance is constant, the charging current i becomes high in a case in which the battery voltage is low. Even though the charging current is bypassed via the charge-current control resistance, there is a problem in that the voltage across the secondary battery 220 can become so high as to exceed the maximum voltage V'.

As the secondary battery degrades, the internal resistance r becomes higher over time. Because of this, the charge-current control resistance R, to be determined using the above-described second approach of the first embodiment, is varied over time.

Therefore, in this second embodiment, by varying the resistance of the charge-current control resistance in accordance with the battery voltage across the secondary battery 220, the amount of charging current that is bypassed is made variable, so that the voltage across the secondary battery 220 is maintained below the maximum voltage V'.

Next, before the operation of the second embodiment is described, an several example operations of the control period setting unit 302 are described. In the following examples, three cases are described. In the first case, the control period setting unit 302 produces a signal pattern (shown in FIG. 9a) that follows the pattern of transmission signals received by the reception circuit 232 (FIG. 3). In the second case, the control period setting unit 302 issues and maintains a high logic level output (shown in FIG. 9b) each time reception circuit 232 receives a new byte of data. In the third case it is assumed that data units are made up of multiple bytes, the control period setting unit 302 issues a high logic level (shown in FIG. 9c) each time reception circuit 232 begins the reception of a new data unit, and maintain the high logic level until reception of the data unit is terminated irrespective of the number of byte within the data unit.

Although in the following discussion one data unit is constituted by two bytes, the present invention is not limited to this.

In the first case, the control period setting unit 302 simply outputs as control period setting data $D_{CI}$, the signal pattern, as shown in FIG. 9(a), of reception data DRC received via the reception circuit 232.

Therefore, control of the charging current is performed only when the reception data DRC is at the "H" level, that is, only during the times when the charging current may flow into the secondary battery 220 in accordance with reception of the reception data DRC.

In the second case, as shown in FIG. 9(b), the control period setting unit outputs the control period setting data $D_{CI}$ which is the "H" level at the start bit of the data byte which constitutes the reception data DRC received via the reception circuit 232, and which is switched to the "L" level at the end of of the received data byte.

Therefore, control of the charging current is performed for each byte, one byte at a time, regardless of the data content, i.e. the bit pattern, of the reception data DRC.

In the third case, as shown in FIG. 9(c), the control period setting unit outputs the control period setting data $D_{CI}$ which is the "H" level at the start bit of the of a multi-byte data unit, which constitutes the reception data DRC received via the reception circuit 232, and which is switched to the "L" level at the reception terminating timing signaling the end of the data unit.

For example, in FIG. 9(c), during the period corresponding to the length of the one data unit, which is comprised of two bytes, the data $D_{CI}$ is maintained at the "H" level.

Therefore, control of the charging current is performed according to the multi-byte length of the one data unit regardless of the data content of the reception data DRC.

Figure 9:
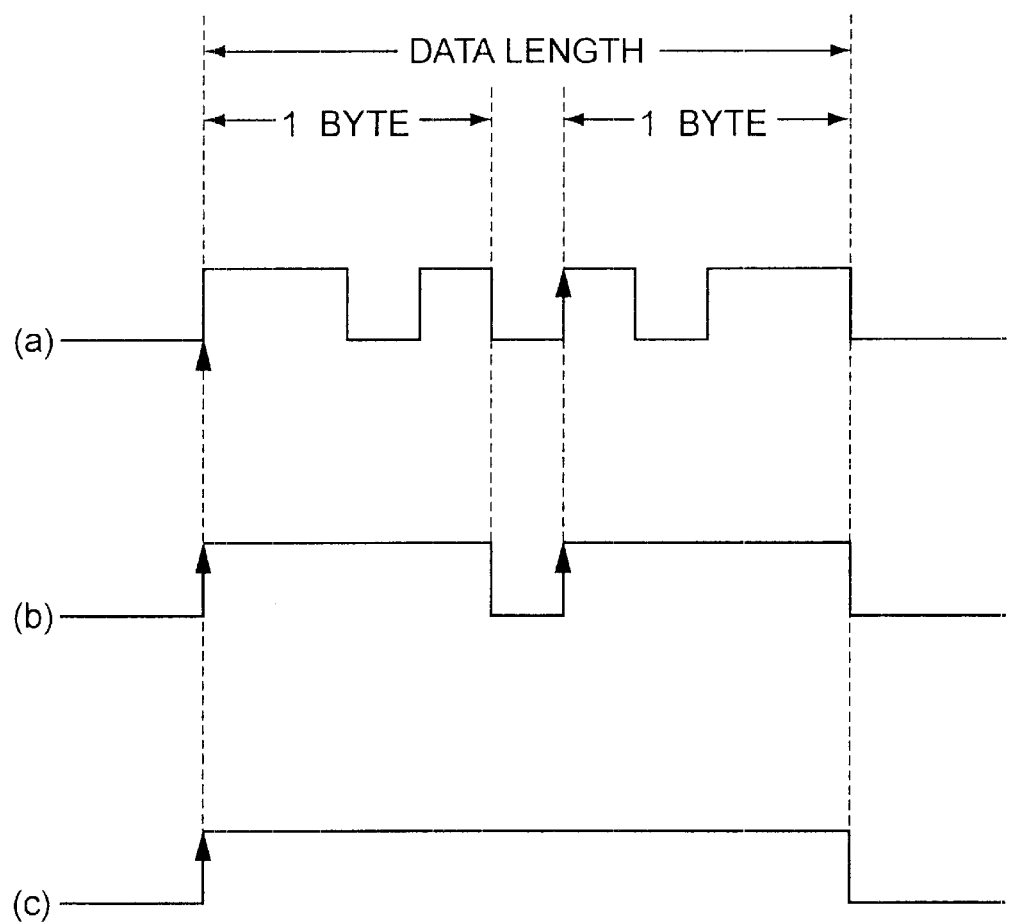
FIG. 9 consists of diagrams illustrating control period instruction data.

Next, the operations of the charging current control circuit according to this second embodiment is described with reference to FIGS. 6, 7, and 9.

The comparator 301 of the charging current control circuit 300 compares the charging voltage V across the secondary battery with the predetermined reference voltage $V_{REF}$ and outputs the comparison result data $D_{CMP}$ to the AND circuit 303.

As a result of this, during the period in which the comparison result data $D_{CMP}$ is maintained at the "H" level and the control period setting data $D_{CI}$ is maintained at the "H" level, that is, during the period in which the charging voltage V exceeds the reference voltage $V_{REF}$ and the control period setting data $D_{CI}$ is maintained at the "H" level, the AND circuit 303 outputs the control period instruction data $D_{CIND}$ as the "H" level to the charging current control resistance setting unit 305.

In a case in which the charge-current control resistance R is set using the above-described first approach of the first embodiment, the parameter setting unit 304 outputs the maximum voltage V' and the charging current i as parameters to the charging current control resistance setting unit 305. In a case in which the charge-current control resistance R is set using the above-described second approach of the first embodiment, the parameter setting unit 304 outputs the maximum voltage V', the charging current i, the actual battery voltage $V_0$, and the internal resistance r as parameters to the charging current control resistance setting unit 305.

As a result, during the period represented by the control period instruction data $D_{CIND}$ in order to select one or a plurality of charge-current control resistances to be actually used from among the charge-current control resistances R1 to Rn based on the parameters (V', i, $V_0$, r), the charging current control resistance setting unit 305 sets the "H" level to the corresponding control signal S1 to Sn and outputs it to the resistance unit 306.

This allows the resistance unit 306 to turn on the corresponding transistor whose control signal (S1-Sn) is at the "H" level and to insert the corresponding charge-current control resistance R1-Rn into the circuit.

As a specific example, in a case in which charge-current control resistances R1 and R2 are required for obtaining a combined resistance $R_{SGM}$ necessary for diverting a desired current through resistance unit 306, the control signals S1 and S2 are set to the "H" level.

As a result of this, the transistors 308-1 and 308-2 are turned on, which insert the charge-current control resistances R1 and R2 between the power source $V_{CC}$ and the ground. The combined resistance $R_{SGM}$ is $$R_{SGM} = (R1+R2)/(R1 \cdot R2).$$

In a case in which the charge-current control resistance for controlling the charging current i is determined using the above-described first approach of the first embodiment, this combined resistance $R_{SGM}$ is set with respect to the maximum voltage V' of the secondary battery 220 so that the relationship $$R_{SGM} \leq V'/i_0$$

is satisfied. Hence, while the reception circuit 232 receives the signals, since the charging current i flowing through the secondary battery 220 is $$i \leq 0,$$

the secondary battery 220 is not charged.

In a case in which the charge-current control resistance for controlling the charging current i is determined using the above-described second approach of the first embodiment, the combined resistance $R_{SGM}$ is set with respect to the maximum voltage V' of the secondary battery 220, the internal resistance r of the secondary battery 220, and the actual battery voltage $V_0$ so that the relationship $$R_{SGM} \leq (r \cdot V')/(i_0 \cdot r + V_0 - V')$$

is satisfied. Hence, since the charging voltage V of the secondary battery 220 is always satisfied by the relationship $$V \leq V',$$

the voltage V of the secondary battery 220 does not exceed the tolerance voltage V'.

As described above, according to this second embodiment, when signals are received, since the charging current is controlled in accordance with the mode of the reception signal, the voltage across the secondary battery does not exceed the maximum voltage, which can prevent the secondary battery from being degraded when signals are received.

Figure 10:
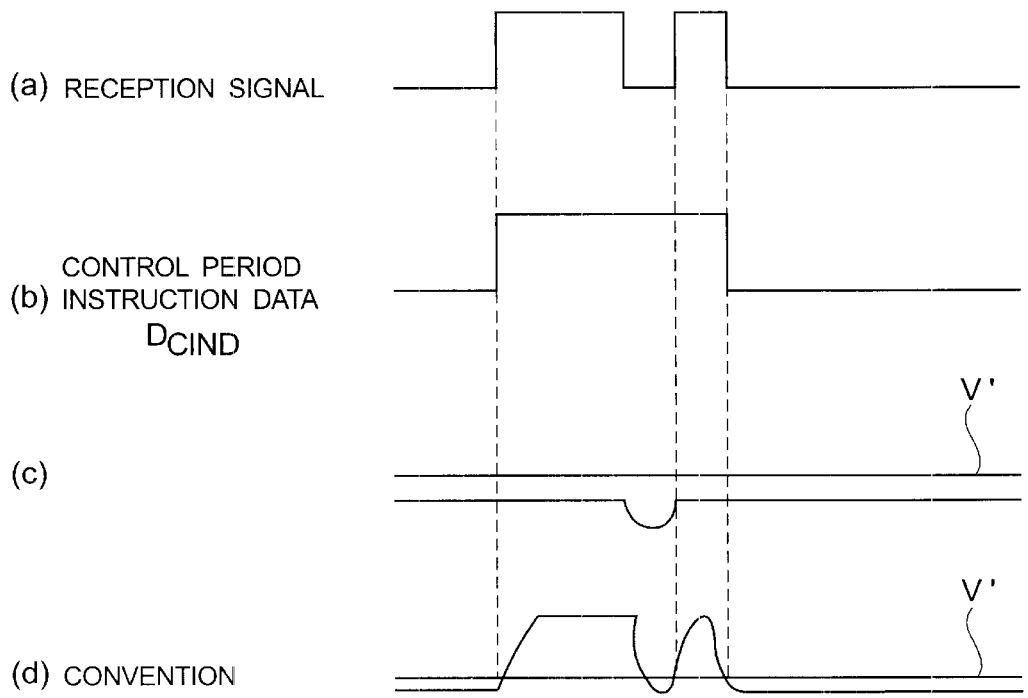
FIG. 10 is a diagram illustrating advantages of the second embodiment.

That is, in a case in which a signal as shown in FIG. 10(a) is received, A "H" level is applied to the control period instruction data $D_{CIND}$ as shown in FIG. 10(b). When the control period instruction data $D_{CIND}$ is at the "H" level, the charging current is bypassed.

Therefore, unlike a conventional example shown in FIG. 10(d), the voltage across the secondary battery does not exceed the maximum voltage V' as shown in FIG. 10(c), so that the degradation of the secondary battery that in the prior art is accompanied by the signal reception can be prevented.

Figure 11:
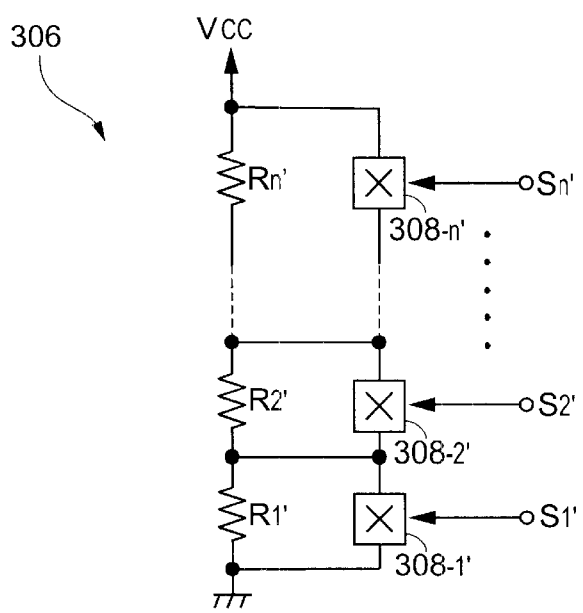
FIG. 11 is a diagram illustrating a modified example of the second embodiment.

In the above-described description of the second embodiment, the construction of the resistance unit 306 is one in which the resistances are connected in parallel. However, in a first modification of the second embodiment shown in FIG. 11, the resistance unit 306 may be constructed to be provided with analog switches 308-1' to 308-n' which are turned on in response to the charging current control resistance setting unit 305 setting the corresponding control signals S1' to Sn' to an "H" logic level when transmission signals are received; and charge-current control resistances R1' to Rn' connected end-to-end so as to control the amount of charging current that flows through the secondary battery 220 by creating a diversion current dependent on the resistance of the charge-current control resistances when the corresponding analog switches 308-1' to 308-n' are turned on. With this construction, the same advantage as in the above-described unmodified implementation of the second embodiment can be obtained as well.

Figure 17:
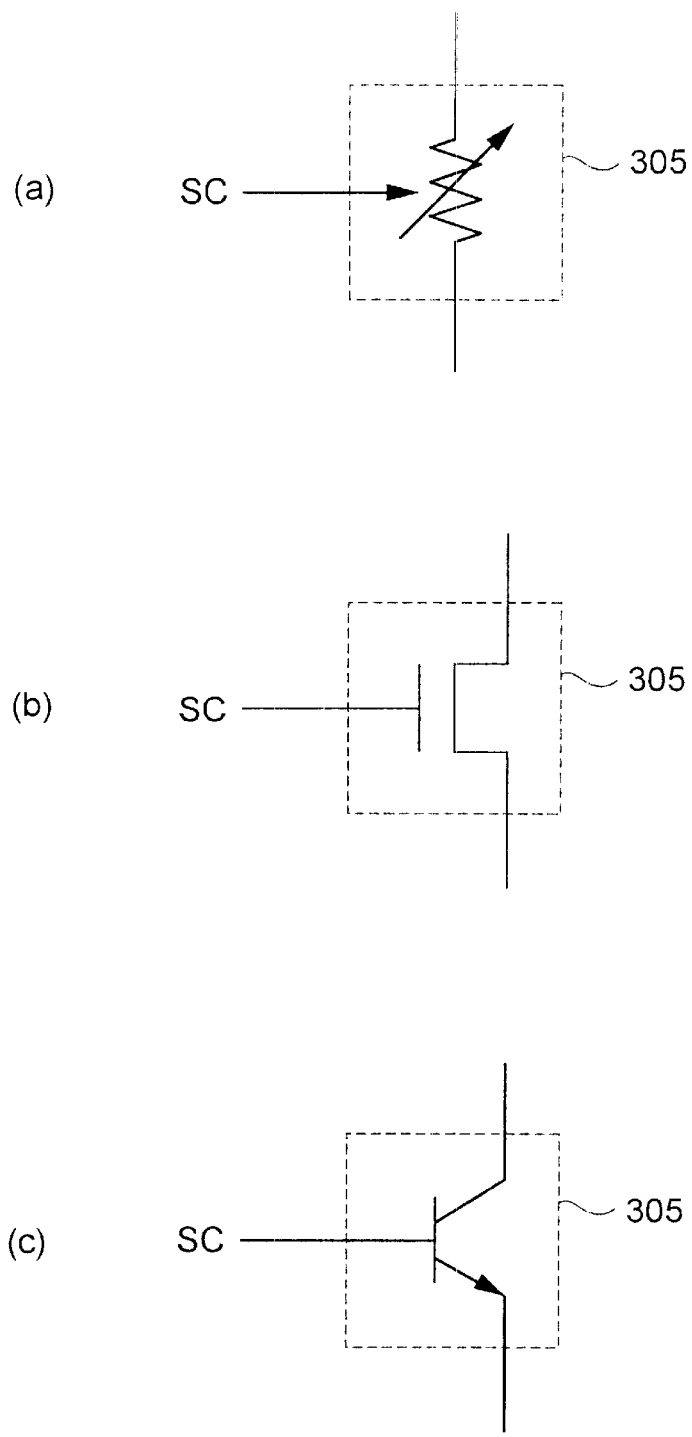
FIG. 17 consists of diagrams illustrating a modified example of the second embodiment.

In the description of the second embodiment and its first modified example, the construction of the resistance unit 306 is one where the resistance elements are connected in parallel or in series. However, in a second modification of the second embodiment, the resistance unit 306 may be constructed so that the bypass current amount is made variable by using a variable resistance element, as shown in FIG. 17(a), in which the resistance thereof can be changed in accordance with a control signal SC from the charging current control resistance setting unit 305. As a more specific example, an MOS transistor, shown in FIG. 17(b), or a BJT transistor, shown in FIG. 17(c), is used in which the control signal SC is input to the gate terminal of the MOS transistor or to the base terminal of the BJT transistor. With this construction, the same advantage as in the above-described unmodified second embodiment can be obtained.

In each of the above-described embodiments, the charging current is bypassed so that the battery voltage across the secondary battery is prevented from exceeding the maximum voltage. In a third embodiment, the battery voltage across the secondary battery is prevented from exceeding the maximum voltage by controlling the energy balance between electrical energy derived at the time of receiving signals and electrical energy released at the time of sending signals.

That is, the electrical energy corresponding to the energy charged into the secondary battery as a result of signal reception is released during signal transmission.

More specifically, the following two example signal transmission modes may be used depending on how close the battery's voltage is to the maximum voltage.

In the present embodiment, energy is balanced by applying echo-back transmission, i.e. the retransmitting back to the source of the same data that is received.

When data is transmitted, electrical energy is discharged from the battery, which can offset the electrical energy charged into the battery during data reception.

In this case, the amount of charged electrical energy and the amount of discharged electrical energy are not necessarily equal. The amount of discharged electrical energy may be appropriately selected in accordance with the battery voltage across the secondary battery.

Figure 12:
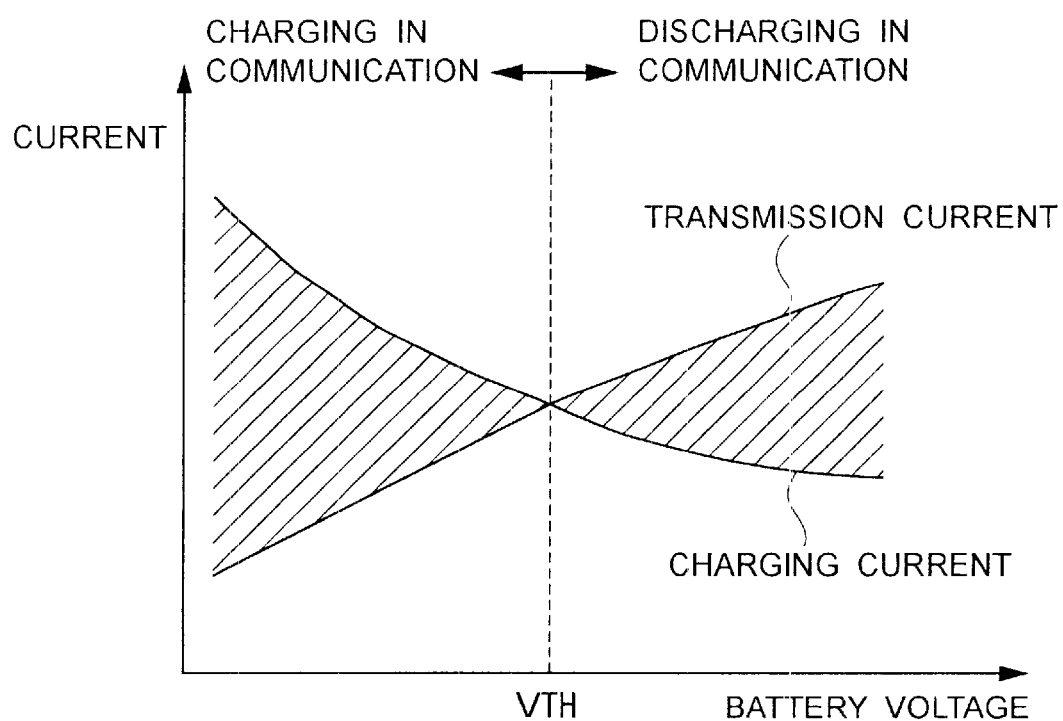
FIG. 12 is a graph illustrating operation of a third embodiment.

For example, in a case in which the battery voltage is close to the maximum voltage, that is, in a case in which the battery voltage exceeds the threshold voltage VTH shown in FIG. 12, the data transmission for discharging the battery should be selected so that the amount of charging current is less than the amount of discharging current. In a case in which the battery voltage is less than the threshold voltage VTH shown in FIG. 12, the data transmission for discharging the battery should be selected so that the amount of charging current is greater than the amount of discharging current. In short, data transmission may be selected so that the amount of charging into the secondary battery and the amount of discharging from the secondary battery are substantially identical.

When the battery voltage is close to the maximum voltage, a transmission-for-discharging mode is selected where the amount of discharging during data transmission is greater than the amount of charging during data reception. When the battery voltage is lower than the maximum voltage, a transmission-for-charging mode is selected where the amount of discharging during data transmission is less then the amount of charging during data reception.

To be more specific, for example, when the station transmits data to the electronic watch, the electronic-watch needs to transmit only a short reply per data reception (i.e. transfer acknowledgement, retransmission request, and the like). The watch implements the short reply irrespective of whether the communication received from the station consists of one datum (which may consist of one or more bytes) or a collection of data organized into a data block. Therefore, if it is desired that the battery be charged during data reception, then the station will implement data block transmission to the watch. Since the watch sends only a short reply at the end of each data block received, the amount of charging during data reception is greater than the amount of discharging during data transmission. If it is desired that the battery not undergo charging during data reception, then the station will transmit one datum at a time, which will require that the watch make more transmission responses and thus discharge more energy.

Therefore, when the battery voltage is close to the maximum voltage, pieces of data (i.e. one datum at a time) are individually transmitted from the station. When the battery voltage is low, groups of data are transmitted all together from the station using a data block transfer.

That is, the data transmission method should be adopted so that when the voltage across the secondary battery is close to the maximum voltage, discharging current>charging current holds; and when the voltage across the secondary battery is lower than the threshold voltage VTH, discharging current<charging current holds.

As described above, according to this third embodiment, by balancing the amount of charging resulting from data reception and the amount of discharging resulting from data transmission, the voltage across the secondary battery can be controlled so as not to exceed the maximum voltage. Therefore, degradation of the secondary battery can be lessened.

In the above-described first embodiment and second embodiment, by bypassing the charging current using the charging current control circuits 235 and 300, respectively, the battery voltage across the secondary battery is controlled so as not to exceed the maximum voltage. In the above-described third embodiment, by controlling the balance of the electrical energy derived at the time of signal reception and the electrical energy released at the time of signal transmission, the battery voltage across the secondary battery is controlled so as not to exceed the maximum voltage. The following is a fourth embodiment that prevents charging current from the reception circuit from flowing into the secondary battery while signals are received.

In each of the above-described embodiments, the limiter circuit 231 is constructed to be activated so that the voltage across the secondary battery 220 in charging does not exceed the maximum voltage.

However, when communication is performed, since the limiter circuit 231 is always in an inactive state, there is a possibility that the voltage across the secondary battery 220 may exceed the maximum voltage due to the charging current from the reception circuit.

Figure 13:
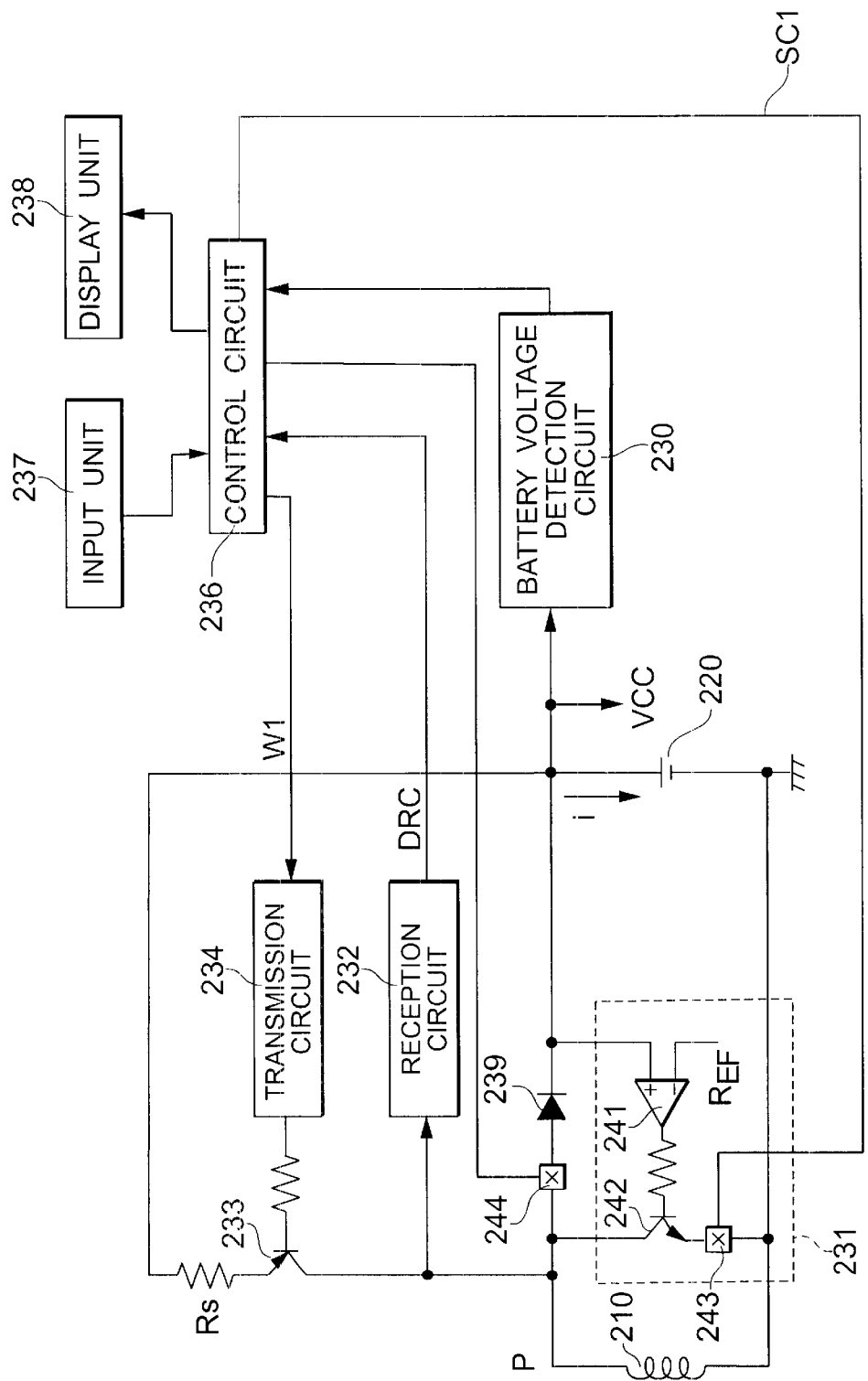
FIG. 13 is a diagram illustrating operation of a fourth embodiment.

Therefore, in this fourth embodiment, as shown in FIG. 13, by providing an analog switch 244 in a charging current path leading from the reception circuit to the secondary battery, the control circuit 236 controls the switch so that the charging current does not flow into the secondary battery while the reception circuit performs the receiving operation.

As a result of this, in the same manner as in each of the above-described embodiments, using the simple construction, the voltage across the storage device (secondary battery) can be controlled so as not to exceed the maximum voltage.

In the first to third embodiments, in a case in which the voltage across the secondary battery 220 is higher than a predetermined voltage, the charging current control circuit 235 is put into a normally connected state.

However, in an implementation such as shown in FIG. 3, when the charging current control circuit 235 is maintained in a connection state even during non-charging periods (including non-communicating periods), the secondary battery 220 is caused to discharge. Hence, there can be a problem in that the battery capacity is unnecessarily decreased.

On the other hand, since the limiter circuit 231 can be active during the non-communicating period, the voltage across the secondary battery 220 does not exceed the maximum voltage. However, since the limiter circuit 231 is inactive during the communicating period, the charging current control circuit 235 must be activated.

Therefore, in this fifth embodiment, a switch 246 is provided in the charging current control circuit 235 in order to activate the charging current control circuit 235 only during the communicating period in which the limiter circuit 231 is inactive.

Figure 14:
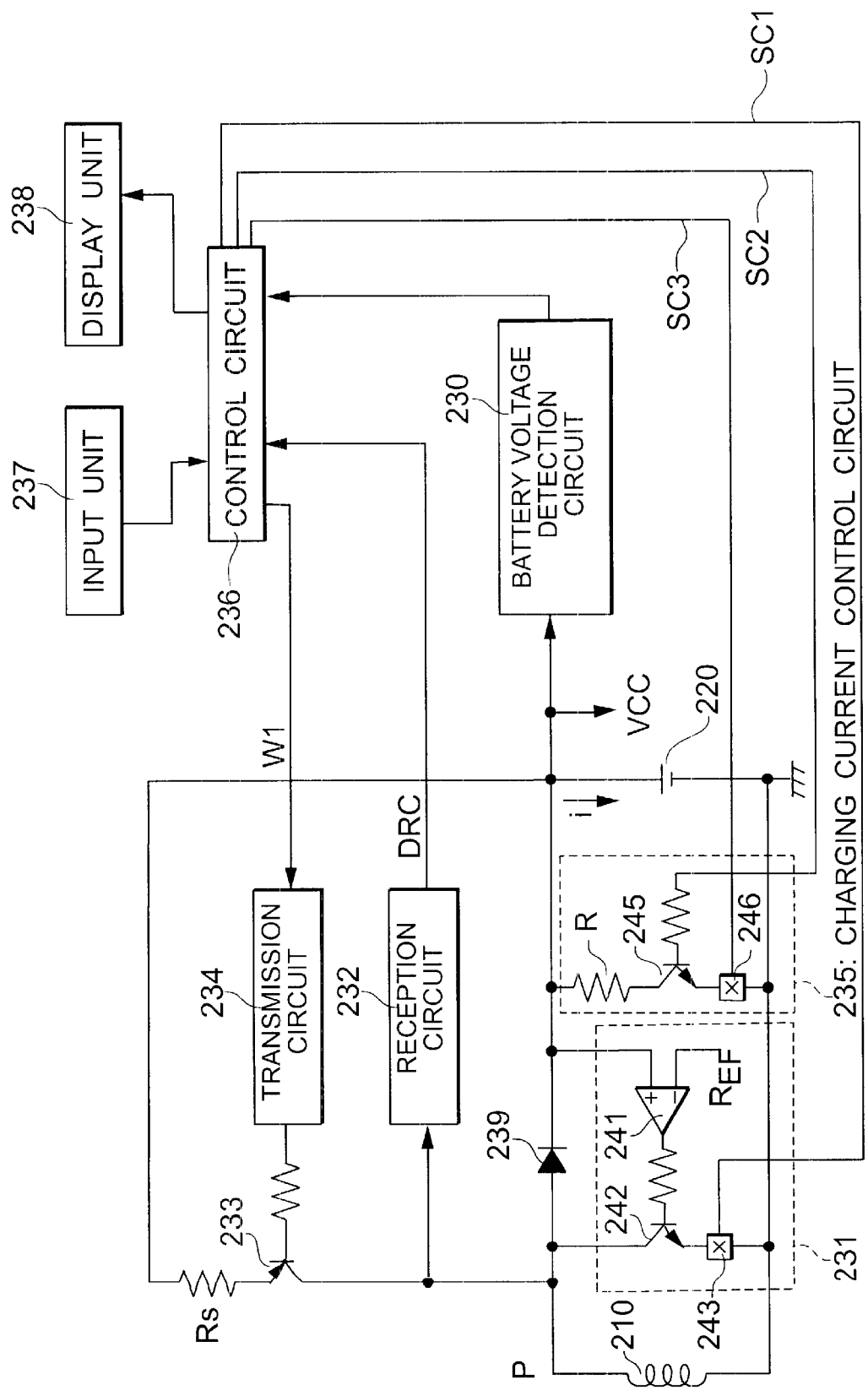
FIG. 14 is a diagram illustrating operation of a fifth embodiment.

To be specific, as shown in FIG. 14, the analog switch 246, which is turned off during the normal operating period, and which causes the charging current control circuit 235 to be inactive under the control of the control circuit 236, is provided in a current path between the transistor switch 245 and the secondary battery 220.

Only when the limiter circuit 231 is put into the inactive state, in order to prevent the voltage across the secondary battery 220 from exceeding the maximum voltage, the analog switch 246 is turned on so that the charging current can be bypassed.

As a result of this, the unwanted discharge during the normal operation period is eliminated and the voltage across the secondary battery 220 can be maintained at the operational voltage.

In the above-described embodiments, the charging state is judged based on the voltage across the secondary battery 220. However, the charging state can be judged based on the variations of the charging current (average charging current; see FIG. 8) of the secondary battery. In this case, instead of the battery voltage detection circuit 230 of FIG. 3, a charging current detection circuit should be constructed so as to be provided for detecting the charging current of the secondary battery 220.

Figure 18:
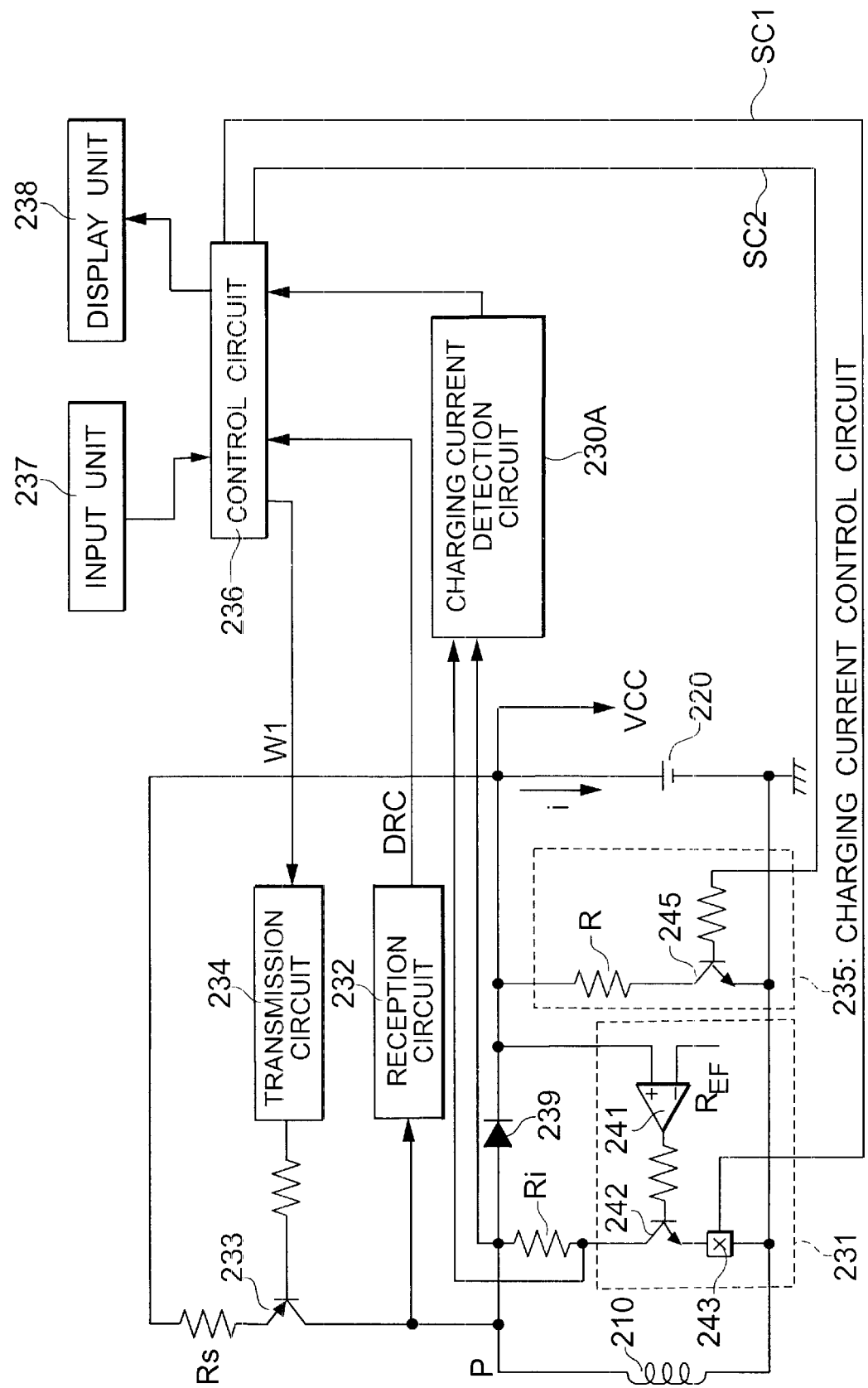
FIG. 18 is a diagram illustrating a modified example of the above-described embodiment.

In other words, as shown in FIG. 18, instead of the battery voltage detection circuit 230, in a case in which the transistor 242 for detecting the charging current of the secondary battery 220 is turned on, a charging current detection circuit 230A for measuring a current flowing into the transistor 242 side via a current detecting resistor R1 should be constructed so as to be provided in series with the transistor 242.

In the above-described embodiments, station 100 serves as an exemplary electronic device for transmitting charging power and electronic watch 200 serves as an exemplary electronic device to be charged with the transmitted charging power. The embodiments are not restricted to these example. For example, the invention can be applied to an electronic device provided with a secondary battery to be charged, such as an electric toothbrush, an electric shaver, a cordless telephone, a portable telephone, a personal handy phone system terminal, a mobile personal computer, or a PDA (Personal Digital Assistant), and to the chargers therefor.

In the above embodiments, although the charge-current control resistance is used exclusively for bypassing the charging current, it can also be used for measuring the internal resistance of the secondary battery or for estimating the capacity thereof.

This example will be described more specifically with reference to FIG. 3.

In a case in which the internal resistance is measured in the embodiment of FIG. 3, initially, under the control of the control circuit 236, the battery voltage detection circuit 230 detects the voltage value $E_{vd}$ of the secondary battery 220 during non-charging conditions, and the control circuit 236 then issues the control signal $SC_2$, whereby the switch transistor 245 is turned on.

This allows the charge-current control resistance R to be connected in parallel with the secondary battery 220, thereby forming a discharging path.

The battery voltage detection circuit 230 detects the voltage value $E_{vd}$ of the secondary battery 220.

The voltage value $E_{vc}$ (the charging voltage across secondary battery 220) during charging conditions (i.e. during a time when a signal is induced at a terminal P), is stored in a first register, which is not shown, of the control circuit 236.

As the detecting timing of this voltage value $E_{vc}$, the timing just before the interruption of charging or the timing just after resumption of charging is preferable. Likewise, even the timing just after the interruption can be used as long as it enables increase in the voltage accompanied by the charging to be detected.

The voltage value $E_{vd}$ of the secondary battery 220 at the time just before a signal is induced at the terminal P, for example, at the time when a predetermined time (for example, 10 seconds) has elapsed since the interruption of the charging, is stored in a second register, which is not shown, of the control circuit 236.

The voltage value $E_{vr}$ of the secondary battery 220 at the time when a predetermined time has elapsed since the charging current control circuit 235 causes the charge-current control resistance R to be connected to the secondary battery 220 is stored in a third register, which is not shown, of the control circuit 236.

Next, the control circuit 236 computes a difference between voltages $E_{vc}$ and $E_{vd}$, that is, increase in the voltage $\Delta E_v$ due to the internal resistance of the secondary battery 220.

The control circuit 236 can compute the internal resistance r of the secondary battery 220 based on the voltage values $E_{vd}$ and $E_{vr}$ and the resistance Re of the charge-current control resistance R using the following expression $$r = R_e \cdot (E_{vd} - E_{vr})/E_{vr}.$$

The control circuit 236 is provided with a plurality of conversion tables for pre-converting the increase in the voltage $\Delta E_v$ (=$E_{vc}$-$E_{vd}$) into a battery capacity F and outputting it. The converting tables are arranged so that each corresponds to internal resistances (or internal resistance range) of the secondary battery 220 which are different from one another. By specifying, based on the computed internal resistance r of the secondary battery 220, a converting table among a plurality of converting tables to be actually used when increase $\Delta E_v$ (=$E_{vc}$-$E_{vd}$) in the voltage is converted into the battery capacity F and the battery capacity F is output, the battery capacity F can be easily computed.

The above-described measurement for the internal resistance and estimation method for the battery capacity are examples. Alternatively, the internal resistance measurement and the battery capacity estimation can be performed using another method based on the voltage across the secondary battery measured at a predetermined timing by controlling connection/non-connection of the charge-current control resistance.

For example, they can be arranged so that the secondary battery is intermittently charged; the secondary battery is connected in parallel with the charge-current control resistance in the interrupt period of charging; the charge voltage which is the voltage across the secondary battery at one time of a first predetermined period before the interruption of charging, the first predetermined period after the resumption of charging, and the first predetermined period after the interruption of charging (only during the period that enables increase in the voltage due to charging to be detected) is detected; a resistance-connection time voltage which is the voltage across the secondary battery at a second predetermined period after the interruption of charging is detected; the difference voltage is computed by subtracting the resistance-connection time voltage from the charging-time voltage; the internal resistance of the secondary battery is computed based on the difference voltage and the resistance of the charge-current control resistance; and the battery capacitance of the secondary battery is estimated based on the difference voltage and the computed internal resistance.

In the above-described third modified example, only the internal resistance of the secondary battery is measured. In the fourth modified example, charging control is additionally performed using the measured internal resistance.

In comparison with the battery voltage of the secondary battery in a case in which charging or communication (particularly reception) is not performed (hereinafter referred to as "normal battery voltage"), the battery voltage is higher in a case in which charging or communication (particularly reception) is performed (hereinafter as a matter of convenience, referred to as a communicating-time battery voltage).

This is because the voltage is raised due to the internal resistance of the secondary battery.

Figure 15:
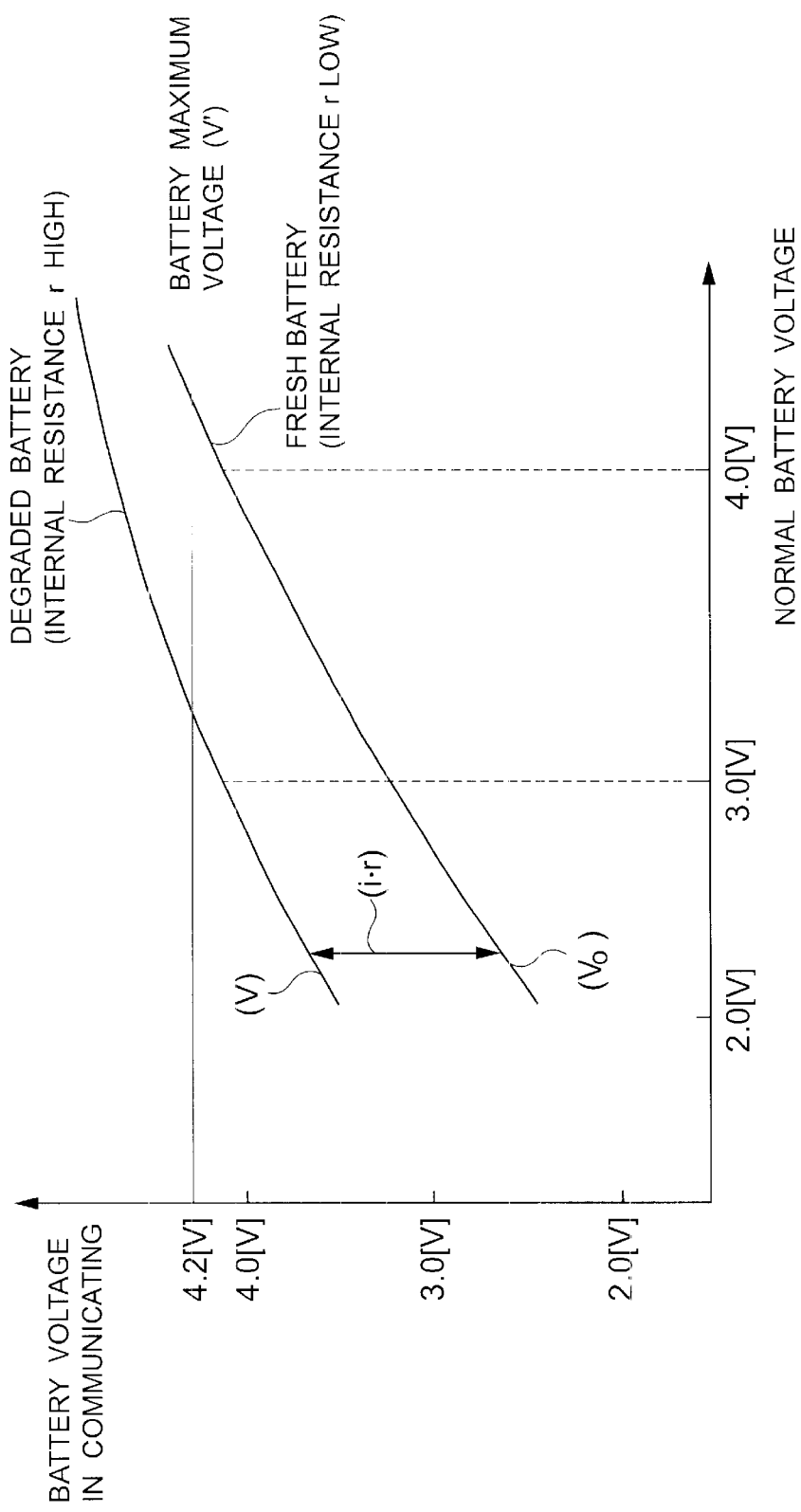
FIG. 15 is a graph illustrating the relationship between normal battery voltage and communicating-time battery voltage.

To be more specific, as shown in FIG. 15, in a fresh battery (a so-called "unused battery") whose internal resistance is low, the normal battery voltage and the communicating-time battery voltage are substantially identical.

On the other hand, in a degraded battery whose internal resistance is high, the communicating-time battery voltage is higher than the normal battery voltage.

For example, the communicating-time battery voltage across the fresh battery becomes approximately 4.0 [V] when the normal battery voltage is approximately 4.0 [V]. The communicating-time battery voltage across the degraded battery becomes approximately 4.0 when the normal battery voltage is approximately 2.8 [V].

Therefore, in a case in which the internal resistance r is not monitored, by previously identifying an upper limit of the internal resistance of the battery during the service life thereof, the charging current must be controlled so that the communicating-time voltage does not exceed the battery maximum voltage V' (in FIG. 15, approximately 4.2 [V] even when the communicating-time battery voltage rises due to the degradation of the battery.

Accordingly, when the internal resistance r is not monitored, even in a case of the fresh battery in which the internal resistance thereof is low at an early stage of use, charging accompanied by the communication, that is, the charging current i, is limited. Therefore charging using the current accompanied by communication (particularly, reception) cannot be practically performed.

In this fourth modified example, considering variations in the resistance value of the internal resistance r accompanying the degradation of the secondary battery, charging is performed as long as the voltage across the secondary battery does not exceeded the maximum voltage V'. In order to achieve the operational time of the electronic device, efficient charging is performed by monitoring the internal resistance of the secondary battery and by controlling the charging current in accordance with the internal resistance.

Figure 16:
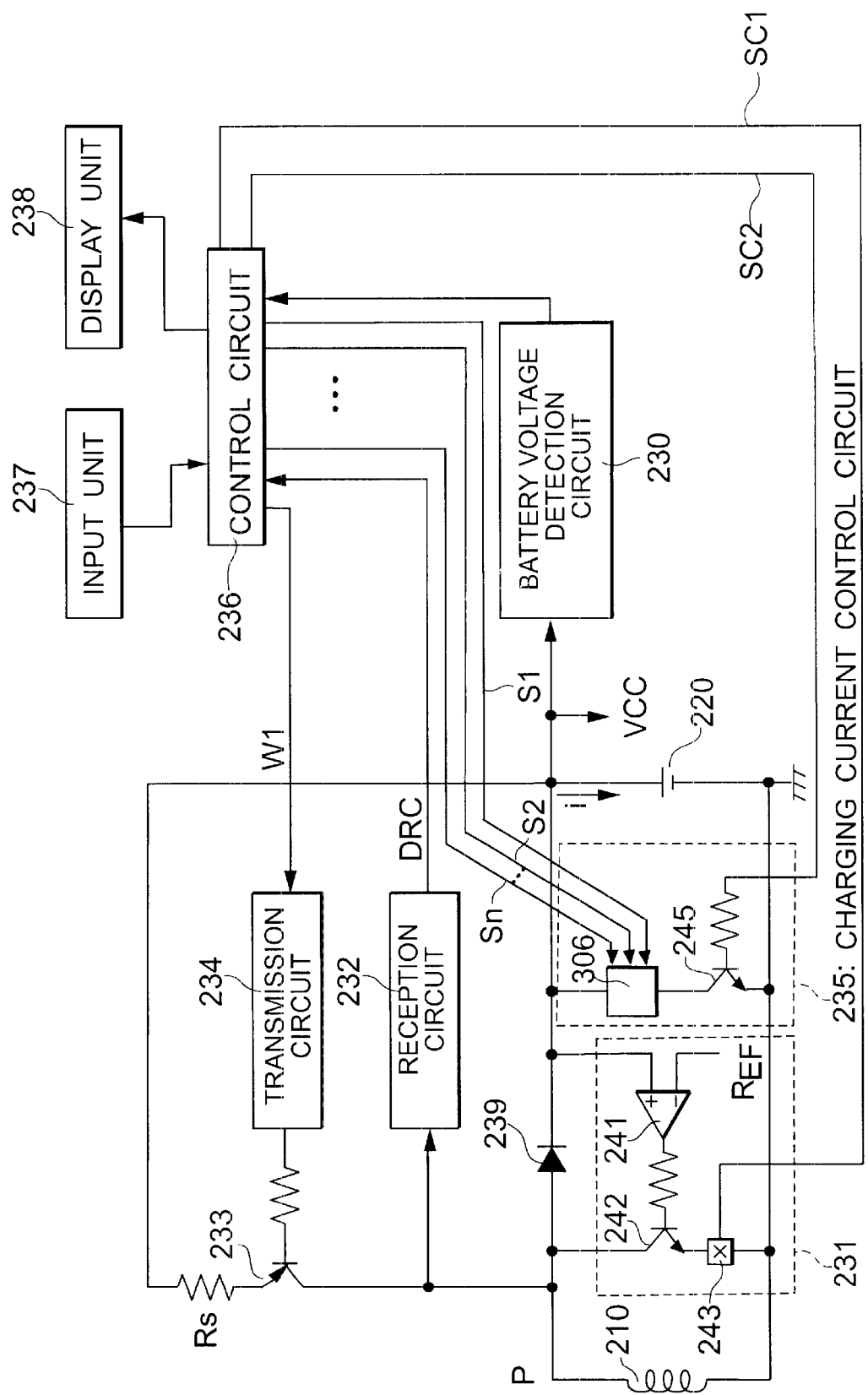
FIG. 16 is a general construction block diagram of main components of an electronic watch of a fourth modified example of the embodiment.

FIG. 16 shows a general construction block diagram of main components of an electronic watch which is an electronic device according to the fourth modified example. In FIG. 16, elements that are identical to corresponding elements in the first embodiment in FIG. 3 have the same reference numerals, and repeated description of identical elements is omitted.

In FIG. 16, that which differs from the first embodiment is a construction in which, instead of the charge-current control resistance R, the resistance unit 306 according to the second embodiment is provided (see FIGS. 6 and 7) and the control circuit 236 controls the resistance unit 306 based on the internal resistance detected by the control circuit 236.

Next, main operations are described.

As shown in the third modified example, the control circuit 236 computes the difference between the voltage values $E_{vc}$ and $E_{vd}$, that is, the increase in the voltage $\Delta E_v$ due to the internal resistance of the secondary battery 220 and then computes the value of the internal resistance r based on the voltage values $E_{vd}$ and $E_{vr}$, and the resistance Re of the charge-current control resistance R using the following expression $$r = Re \; (E_{vd} - E_{vr})/E_{vr}.$$

Next, the control circuit 236 computes the resistive value of the resistance unit 306 corresponding to the computed internal resistance r, sets corresponding control signal S1-Sn to a logic "H" level so that one or a plurality of charge-current control resistance to be actually used is selected from among charge-current control resistances R1 to Rn, and outputs the corresponding control signal to the resistance unit 306.

This allows the resistance unit 306 to turn on a transistors corresponding to the control signals S1-Sn having an "H" level, whereby the corresponding charge-current control resistances $R_1$ to $R_n$ are inserted in the circuit.

As a result of this, the charging current of the secondary battery is set so as to flow under conditions in which the internal resistance r of the secondary battery 220 is low and the current is controlled so as not to flow under conditions in which the internal resistance r is high.

To be specific, the combined resistance $R_{SGM}$ of the resistance unit 306 is set with respect to the maximum voltage V' of the secondary battery 220, the detected internal resistance r of the secondary battery 220, and the actual battery voltage $V_0$ so that the relationship $$R_{SGM} \leq (r \cdot V')/(i_o \cdot r + V_0 - V')$$

is satisfied. The charging voltage V of the secondary battery 220 is always satisfied by the relationship $$V < V'.$$

Therefore, the voltage across the secondary battery 220 does not exceed the maximum voltage V' and charging can be efficiently performed.

In a first additional mode of operation, the electronic device is provided with a storage device in which charging can be performed from the outside and the charging voltage is set so as not to exceed the preset maximum voltage, a reception circuit for receiving signals from the outside, and a charging current control circuit in which a resistance element and a switching circuit allowing the resistance element to be connected in parallel with the storage device are provided so that a predetermined amount of charging current is bypassed so as not to exceed the maximum voltage across the storage device because of the reception. In the electronic device in which, by partially sharing the charging path to the storage device and the signal path to the reception circuit, the charging is applied to the storage device when the reception circuit receives signals, the electronic device is arranged so that internal resistance computation step is provided in which the resistance element is caused to discharge the storage device as a discharge resistance for the storage device and the internal resistance of the storage device is computed based on the voltage across the storage device at a predetermined timing.

In a second additional mode of operation, the electronic device is provided with a storage device in which charging can be performed from the outside and the charging voltage is set so as not to exceed the preset maximum voltage, a reception circuit for receiving signals from the outside, and a charging current control circuit in which a plurality of resistance elements and a switching circuit allowing one or a plurality of the resistance elements to be connected in parallel with the storage device are provided so that a predetermined amount of charging current is bypassed so as not to exceed the maximum voltage across the storage device because of the reception. In the electronic device in which, by partially sharing the charging path to the storage device and the signal path to the reception circuit, the charging is applied to the storage device when the reception circuit receives signals, the electronic device is arranged so that internal resistance computation step is provided in which the resistance element is caused to discharge the storage device as a discharge resistance for the storage device and the internal resistance of the storage device is computed based on the voltage across the storage device at a predetermined timing.

In the first or second additional modes of the present invention, the resistance control step may be arranged to be provided so as to control the resistance of the resistance element based on the detected internal resistance.

The electronic device is provided with a storage device in which charging can be performed from the outside and the charging voltage is set so as not to exceed the preset maximum voltage, a reception circuit for receiving signals from the outside, and a charging current control circuit in which a variable resistance element connected in parallel with the storage device, an internal resistance detection circuit for detecting the internal resistance of the storage device and a resistance control circuit for controlling the resistance of the variable resistance element based on the detected internal resistance are provided so that a predetermined amount of charging current is bypassed so as not to exceed the maximum voltage across the storage device because of the reception. In the electronic device in which, by partially sharing the charging path to the storage device and the signal path to the reception circuit, the charging is applied to the storage device when the reception circuit receives signals, the electronic device is arranged so that internal resistance computation step is provided in which the variable resistance element is caused to discharge the storage device as a discharge resistance for the storage device and the internal resistance of the storage device is computed based on the voltage across the storage device at a predetermined timing.

In the fourth additional mode of the present invention, the resistance control step is arranged to be provided so as to control the resistance of the variable resistance element based on the detected internal resistance.

The electronic device is provided with a storage device in which charging can be performed from the outside and the charging voltage is set so as not to exceed the preset maximum voltage, and a reception circuit for receiving signals from the outside, wherein, by partially sharing the charging path to the storage device and the signal path to the reception circuit, the charging can be applied to the storage device when the reception circuit receives signals. The electronic device is arranged so as to be provided with voltage detection step for detecting the voltage across the storage device and charging current bypass step for controlling the voltage across the storage device so as not to exceed the maximum voltage by forming a bypass path for bypassing by only a predetermined amount, based on the detected voltage across the storage device, the charging current flowing to the storage device because of reception only when the reception circuit receives signals.

What is claimed is:

1. An electronic device comprising:
   a charge storage device for storing power transferred from outside said electronic device, said charge storage device being characterized by a predetermined, maximum voltage rating;
   a reception device for receiving data signals from outside said electronic device; and
   a charging-current-control device for controlling a charging current applied to said charge storage device so as not to exceed said maximum voltage; and
   wherein reception of said data signals by said reception device causes charging of said charge storage device by using part of a signal path for conveying said data signals to said reception device as part of a charging path for conveying said charging current to said charge storage device.

2. An electronic device according to claim 1, characterized in that said charging-current-control device is provided with a charging-current-bypass device for bypassing a predetermined amount of said charging current away from said charge storage device.

3. An electronic device according to claim 2, characterized in that said charging-current-bypass device is provided with:
   a resistance element; and
   a switch device for allowing said resistance element to be selectively connected in parallel with said charge storage device.

4. An electronic device according to claim 3, characterized in that said charging-current-control device further includes:
   an internal resistance detection device for measuring the internal resistance of said charge storage device; and
   a resistance control device for controlling the resistance of said resistance element based on the measured internal resistance of said charge storage device.

5. An electronic device according to claim 2, characterized in that said charging-current-bypass device is provided with:
   a plurality of resistance elements; and
   a switching device for allowing at least one of said plurality of resistance elements to be connected in parallel with said charge storage device.

6. An electronic device according to claim 5, characterized in that said charging-current-control device is provided with:
   an internal resistance measuring device for measuring the internal resistance of said charge storage device; and
   a switch control device for controlling said switching device and thereby determining the number of said resistance elements placed in parallel with said charge storage device based on the measured internal resistance of said charge storage device.

7. An electronic device according to claim 2, characterized in that said charging-current-bypass device is provided with:
   a variable resistance element; and
   a resistance control device for setting the resistance value of said variable resistance element based on the magnitude of said charging current or said maximum voltage rating.

8. An electronic device according to claim 7 characterized in that:
   said charging-current-control device is provided with an internal resistance measuring device for measuring the internal resistance of said charge storage device; and
   said resistance control device further controls the resistance of said variable resistance element based additionally on the measured internal resistance of said charge storage device.

9. An electronic device according to claim 2, wherein said charging-current-bypass device includes a bypass switching device for forming a current-bypass path only when said reception device is receiving data signals.

10. An electronic device according to claim 1, characterized in that:
    said data signals include a start bit signal indicating the start a data unit transfer; and
    said charging-current-control device starts to control said charging current based upon reception of said start bit signal.

11. An electronic device according to claim 10, characterized in that said charging-current-control device terminates the control of said charging current upon completion of the data unit transfer initiated by said start bit signal.

12. An electronic device according to claim 1, characterized in that said charging-current-control device modifies its control of said charging current in accordance to one of multiple signal transfer modes received at said reception device, wherein each signal transfer mode is identified by the data transfer pattern of said data signals.

13. An electronic device according to claim 1, characterized in that:
    said charging-current-control device includes:
      an accumulated voltage detection device for monitoring the accumulated voltage across said charge storage device; and
      a voltage comparing device for comparing the accumulated voltage across said charge storage device with a reference voltage of lesser magnitude than said maximum voltage;
    wherein said charging-current-control device activates its control of said charging current when the accumulated voltage of said charge storage device exceeds said reference voltage.

14. An electronic device comprising:
    a charge storage device for storing power transferred from outside said electronic device, said charge storage device being characterized by a predetermined maximum voltage rating;
    a reception circuit for receiving data signals from outside said electronic device;
    wherein reception of said data signals by said reception device causes charging of said charge storage device by using part of a signal path for conveying said data signals to said reception device as part of a charging path for conveying charging current to said charge storage device; and an energy balance control device for controlling the accumulated voltage across said charge storage device so as not to exceed said maximum voltage, wherein said energy balance control device includes a data return device for draining charge from said charge storage device by transmitting a return-data pattern, and wherein said energy balance control device maintains a balance between charge stored into said charge storage device and charge discharged from said charge storage device by controlling the amount of data transmissions by said data return device.

15. An electronic device according to claim 14, wherein said return-data pattern is dependent on the data pattern of data signals received by said reception circuit.

16. An electronic device according to claim 15, wherein said data return device generates said return-data pattern to be identical to the data pattern of the received data signals.

17. An electronic device according to claim 15, characterized in that said data return device selects, as said return-data pattern, one of plurality of a predetermined data patterns based on the cumulative energy of the received data signals.

18. An electronic device according to claim 14, further including:

a data transmission device having multiple transmission modes, each of said transmission modes requiring a different amount of energy usage from said charge storage device; and wherein said energy balance control device selects, based on the accumulated voltage across said charge storage device, one of said multiple transmission modes for responding to data signals received by said reception device.

19. An electronic device according to claim 18, wherein:

if the accumulated voltage across said charge storage device is higher than a predetermined first reference voltage, then said energy balance control device selects a transmission mode that will require a larger amount of energy to respond to said received data signals than the amount of energy charged into said charge storage device during the reception of said data signals; and if the accumulated voltage across said storage device is lower than a predetermined second reference voltage, then said energy balance control device selects a transmission mode that will require a smaller amount of energy to respond to said received data signals than the amount of energy charged into said charge storage device during the reception of said data signals.

20. An electronic device according to claim 14, characterized in that said energy balance control device wherein said return-data pattern is dependent on the received data; and wherein said energy balance control device further includes a discharging-current-control device for controlling the discharging current of said storage device when said return-data pattern is transmitted.

21. An electronic device according to claim 20, characterized in that said discharging-current-control device includes:

a plurality of resistance elements;

a resistance selection and insertion device for selecting any one of or a plurality of resistance elements from among said plurality of resistance elements in accordance with the discharging current to be set and inserting the selected resistance element into a discharging path.

22. An electronic device according to claim 20, characterized in that said discharging-current-control device includes:

a variable resistance element provided in the discharging path having a variable resistance; and a resistance control device for controlling the resistance of said variable resistance element based on the discharging current to be set.

23. An electronic device comprising:

a charge storage device for storing power transferred from outside said electronic device, said charge storage device being characterized by a predetermined maximum voltage rating;

a reception circuit for receiving data signals from outside said electronic device;

wherein reception of said data signals by said reception device causes charging of said charge storage device by using part of a signal path for conveying said data signals to said reception device as part of a charging path for conveying charging current to said charge storage device; and a charging-current-control device having:

an accumulated voltage measuring device for measuring the accumulated voltage across said charge storage device; and a switching device provided between said reception device and said charge storage device for causing said reception device and said storage device to be disconnected when said accumulated voltage measured by said accumulated voltage measuring device exceeds said maximum voltage.

24. A control method for an electronic device including a charge storage device characterized by a predefined maximum voltage rating and effective for storing power transferred from outside said electronic device, and a reception circuit for receiving data signals from outside said electronic device, whereby reception of said data signals by said reception device causes charging of said charge storage device by using part of a signal path for conveying said data signals to said reception device as part of a charging path for conveying charging current to said charge storage device, said control method comprising:

a voltage measuring step for measuring the voltage across said charge storage device; and a charging-current-bypass step for controlling the voltage across said charge storage device so as not to exceed said maximum voltage by bypassing the charging current away from said charge storage device by a predetermined amount based on the measured voltage across said charge storage device.

* * * * *